(No Model.)
S. C. C. CURRIE.
METHOD OF MAKING PLATES OF SECONDARY BATTERIES.
No. 450,834. Patented Apr. 21, 1891.
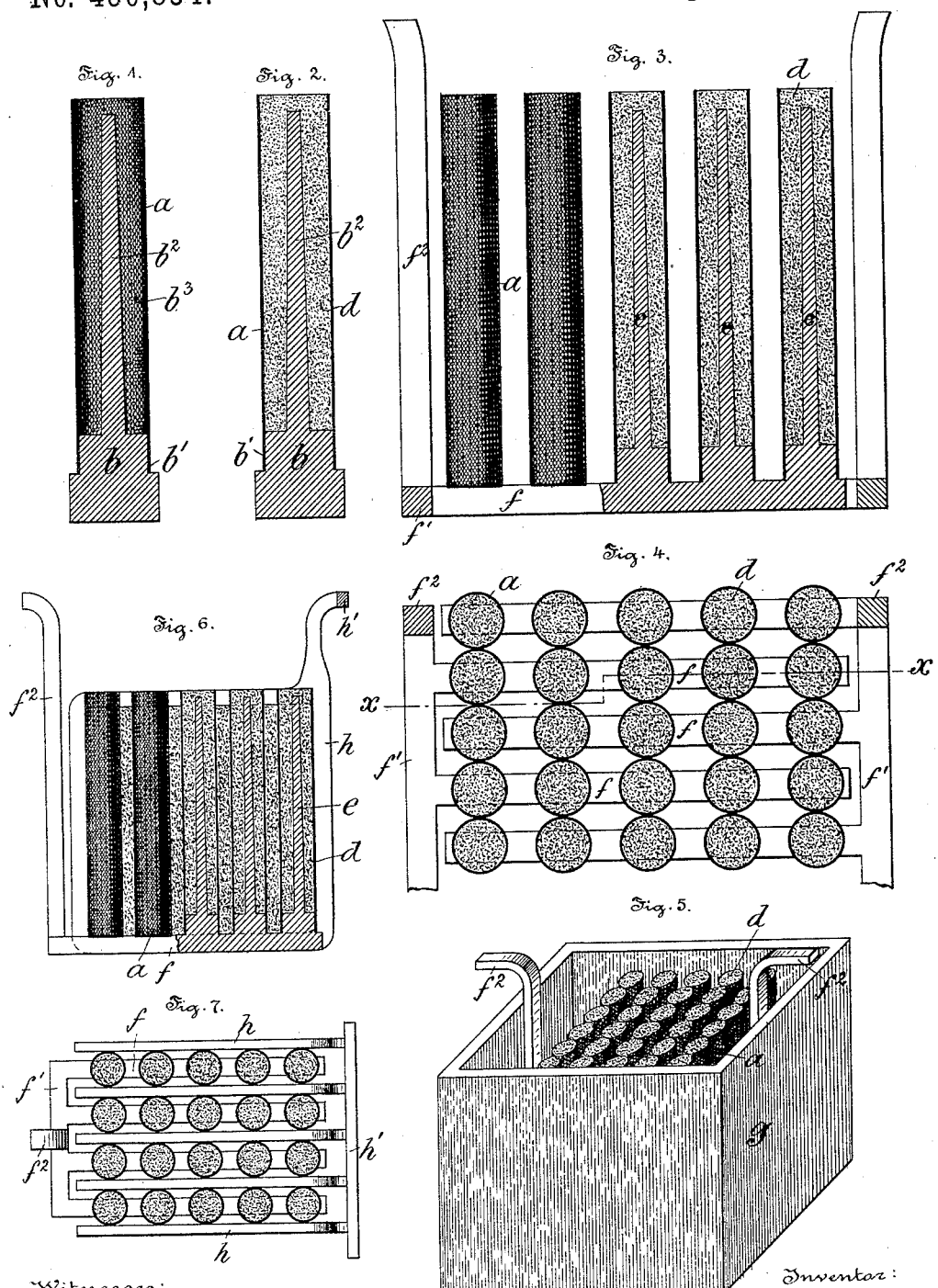

UNITED STATES PATENT OFFICE.

STANLEY CHARLES CUTHBERT CURRIE, OF PHILADELPHIA, PENNSYLVANIA, ASSIGNOR TO THE UNITED GAS IMPROVEMENT COMPANY, OF SAME PLACE.

METHOD OF MAKING PLATES OF SECONDARY BATTERIES.

SPECIFICATION forming part of Letters Patent No. 450,834, dated April 21, 1891.

Application filed November 18, 1890. Serial No. 371,829. (No model.)

*To all whom it may concern:*

Be it known that I, STANLEY CHARLES CUTHBERT CURRIE, a subject of the Queen of Great Britain, but now residing at the city of Philadelphia, in the county of Philadelphia and State of Pennsylvania, have invented certain new and useful Improvements in the Method of Making the Plates or Elements of a Secondary or Storage Battery, of which the following is a specification.

My present invention relates to a method of manufacturing battery elements comprising, essentially, a tube of woven material surrounding an interior conducting-support, and between, onto, and into which is cast a porous crystallized metallic mass.

The principal object of my present invention is to provide a simple, expeditious, and efficient method of making battery elements having the active material or material adapted to become active so applied thereto as that the same is prevented from falling away from the supports thereof.

My invention consists in mounting or fitting a tube of woven material onto a metallic rod provided with a core to constitute a mold, casting fused salts of a metallic material or materials into said mold, allowing the cast mass to cool and crystallize therein, forming a matrix in the crystallized mass by the withdrawal of said rod, casting fused conducting material into said matrix to constitute a central support with or without terminal connections, and reducing the crystallized mass to the metallic state to constitute the porous or active portion of the element.

In producing elements according to my invention use is made of woven tubes of asbestus or other suitable material. These tubes are placed upon a brass or other metallic rod provided with a shoulder adapted for their reception and with a tapering projection or core of less diameter than the interior of the tubes, so that a space is afforded between the core and the inner walls of the tube. This space constitutes a mold into which fused chloride of lead or a fused mixture of the chlorides of lead and zinc or the fused salts of other metallic material or materials is or are poured. After the mass has become cool the brass rod is withdrawn therefrom, leaving a cavity or matrix in the center of the crystallized mass. A series of these partially-completed elements is then mounted in a suitable appliance or mold, and molten lead or other suitable metal is poured into the cavities or matrices previously formed by the withdrawal of the brass cores. This cast conducting material constitutes a central conducting-support for the elements, and by uniting all these central supports by means of a connection provided with a lug or other terminal device the operation of mounting the elements in battery is greatly facilitated. The metallic salt or salts are then reduced either chemically or electrolytically, or by both methods of treatment, to the metallic state or condition to constitute the active portion of the element. A series of elements produced in the above manner may then be washed and mounted in a suitable battery cell or vase for use.

The nature and characteristic features of my invention will be more fully understood from the following description, taken in connection with the accompanying drawings, forming part hereof, and in which—

Figure 1 is a transverse section of a metallic rod provided with a shoulder and with a core and showing a surrounding tube of woven material applied thereto and forming a mold for the reception of the molten metallic salts adapted to be reduced to a metallic state to constitute the active portion of the element. Fig. 2 is a similar view showing the tube filled with cast crystallized metallic salts adapted to be reduced to the metallic state to constitute the active portion of the element. Fig. 3 is a view on the line $x\,x$ of Fig. 4, showing to the left an elevation and to the right a section of an electrode comprising a series of elements made according to my invention and attached to connections having terminal lugs formed integral therewith. Fig. 4 is a top or plan view of two electrodes comprising a series of elements made according to my invention and attached to the respective arms of two connections provided with terminal lugs and arranged for use in a battery-cell. Fig. 5 is a perspective view of an electrolytic cell, showing my improved electrodes mounted therein for the elimination of the acid radical from the active material or material to become active of the elements. Fig. 6 is a view, partly in elevation and partly in section, of electrodes made according to my invention mounted in a cell with ordinary lead plates, and illustrating a slightly-modified method of reducing said electrodes to a metallic state; and Fig. 7 is a top or plan view of Fig. 6.

In the drawings, $a$ is a tube of woven material, as asbestos.

$b$, Figs. 1 and 2, is a brass or other rod provided with a shoulder $b'$ for the reception of the tube $a$ and with a tapering projection or core $b^2$. This core $b^2$ extends upward nearly to the top of the tube $a$, and is of less diameter than the tube, so as to afford an annular space $b^3$ between the interior walls of the tube and core. This annular space $b^3$ constitutes a mold for the reception of the fused salts of a metallic material or materials, as the chloride of lead or the chlorides of lead and zinc, which, when reduced to the metallic state, constitutes the porous, crystallized, or active portion $d$ of the element.

$e$ is a central support formed by casting suitable material, as lead, into the matrix or cavity formed by the removal of the brass rod $b^2$.

$f$ is a connection provided with arms $f'$ and with terminal lugs $f^2$ and preferably cast integral with the supports $e$.

$g$ is a battery cell or vase of the usual or of any preferred construction.

$h$ is a lead plate or element.

$h'$ is a conductor attached to and connecting the plates $h$.

In order that the nature and objects of my invention may be fully understood, a brief description of the process of manufacturing such an element will now be given.

The tube $a$, of woven asbestus or other suitable material is fitted onto the shoulder $b'$ of the tube $b$, and fused metallic salts, as the chloride of lead or the chlorides of lead and zinc, are poured into the space $b^3$ between the core $b^2$ and tube $a$ and the same allowed to cool and crystallize therein. It may be remarked that in practice the fused material in cooling becomes firmly embedded in and attached to the meshes of the tube $a$, thereby increasing the mechanical strength and durability of the element. The rod $b$ is then withdrawn from the cast mass, and the cavity or matrix formed by its withdrawal is filled with fused lead or other suitable conducting material $e$, which constitutes a central support for the element.

In practice two connections $f$, provided with terminals $f^2$ and with arms $f'$, attached to the supports $e$ of a series of partially-completed elements, are mounted in an electrolyte in a vase or cell $g$, so as to constitute the electrodes thereof; or, if preferred, the partially-completed elements and connections therefor may be employed as one of the electrodes in connection with another electrode comprising a series of lead plates $h$, connected together by a conductor $h'$, and are subjected to electrolysis in order to eliminate the acid radical from the cast crystallized mass. The elements, after having been removed from the electrolytic cell and washed, may be used as a positive or negative electrode of a secondary or storage battery and "formed" in the usual or in any other preferred manner.

It will be obvious to those skilled in the art to which my invention appertains that the salt or salts of a metal or metals may be reduced to the metallic state by chemical action or in any other preferred manner without departing from the true spirit of my invention. Hence I do not limit myself to the electrolytic reduction of the cast mass in the manner hereinbefore explained; but,

Having thus described the nature and objects of my invention, what I claim as new, and desire to secure by Letters Patent, is—

1. The method of making a battery plate or element, which consists in fusing the salt or salts of a metal, casting and attaching the fused mass to and between a woven envelope and a core forming a matrix in said mass by removing the core, and attaching the mass to a support by casting fused metal into the matrix and reducing the cast salt or salts to the metallic state by eliminating the acid radical therefrom, substantially as and for the purposes set forth.

2. The method of making a battery plate or element, which consists in fusing the salt or salts of a metal, casting the fused metallic mass between two supports, forming a matrix in said mass by withdrawing one of said supports, and attaching the mass to a conducting-support by filling said matrix with fused metal and reducing said salt or salts to the metallic state, substantially as and for the purposes set forth.

3. The method of making a battery plate or element, which consists in fusing a salt of lead, casting and attaching the fused mass to a woven asbestus support having a brass core, forming a matrix in said mass by removing said core, and attaching the mass to a support by casting fused lead into the matrix and reducing said salt to the metallic state, substantially as and for the purposes set forth.

In witness whereof I have hereunto set my signature in the presence of two subscribing witnesses.

STANLEY CHARLES CUTHBERT CURRIE.

Witnesses:
THOMAS M. SMITH,
RICHARD C. MAXWELL.